US011870129B2

(12) United States Patent
Choi et al.

(10) Patent No.: US 11,870,129 B2
(45) Date of Patent: Jan. 9, 2024

(54) ANTENNA ELEMENT, ANTENNA PACKAGE AND DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Han Sub Ryu, Gyeongsangbuk-do (KR); Won Hee Lee, Gyeonggi-do (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/667,875

(22) Filed: Feb. 9, 2022

(65) Prior Publication Data

US 2022/0271412 A1 Aug. 25, 2022

(30) Foreign Application Priority Data

Feb. 10, 2021 (KR) ........................ 10-2021-0019220

(51) Int. Cl.
*H01Q 1/22* (2006.01)
*H01Q 23/00* (2006.01)

(52) U.S. Cl.
CPC ............... *H01Q 1/22* (2013.01); *H01Q 23/00* (2013.01)

(58) Field of Classification Search
CPC ................................ H01Q 23/00; H01Q 1/22
See application file for complete search history.

(56) References Cited

U.S. PATENT DOCUMENTS

| | | | | | |
|---|---|---|---|---|---|
| 4,063,246 | A * | 12/1977 | Greiser | H01Q 21/065 343/846 |
| 5,216,430 | A * | 6/1993 | Rahm | H01Q 21/065 343/846 |
| 2022/0166125 | A1* | 5/2022 | Kaufmann | H01Q 9/0435 |
| 2022/0231429 | A1* | 7/2022 | Kim | H01Q 21/065 |

FOREIGN PATENT DOCUMENTS

KR 10-2012-0052784 A 5/2012

* cited by examiner

*Primary Examiner* — Hai V Tran
(74) *Attorney, Agent, or Firm* — The PL Law Group, PLLC

(57) ABSTRACT

An antenna element according to an exemplary embodiment includes a radiation body, a first transmission line extending from the radiation body in a first direction, a second transmission line extending from the radiation body in a second direction, a first signal pad extending from an end of the first transmission line in the first direction, and a second signal pad extending from an end of the second transmission line in the second direction.

14 Claims, 7 Drawing Sheets

ANTENNA ELEMENT, ANTENNA PACKAGE AND DISPLAY DEVICE INCLUDING THE SAME

CROSS-REFERENCE TO RELATED APPLICATION(S)

This application claims priority to Korean Patent Application No. 10-2021-0019220 filed on Feb. 10, 2021 in the Korean Intellectual Property Office (KIPO), the entire disclosure of which is incorporated by reference herein.

BACKGROUND

1. Field

The present invention relates to an antenna element, an antenna package and a display device including the same.

2. Description of the Related Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in high frequency or ultra-high frequency bands to be coupled to the display device. In addition, according to development of thin, high-transparency and high-resolution display devices such as a transparent display and a flexible display, it is necessary to develop an antenna so as to also have improved transparency and flexibility.

As the size of a screen in the display device is increased, a space or area of a bezel part or light-shielding part has been decreased. In this case, the space or area in which the antenna can be embedded is also limited, and thereby, a radiation body included in the antenna to transmit and receive signals may be overlapped with a display region of the display device. Accordingly, an image of the display device may be hidden by the radiation body of the antenna or the radiation body may be viewed by a user, thereby causing a deterioration in image quality.

Meanwhile, a dual polarization antenna is an antenna having two polarized waves at a predetermined angle, unlike a general single polarization antenna having only vertically or horizontally polarized waves, and is emerging as a technique capable of reducing installation costs and operation and maintenance costs in a mobile communication system.

Therefore, it is necessary to design a dual polarization antenna for implementing high-frequency communication in a limited space without being viewed by the user.

SUMMARY

It is an object of the present invention to an antenna element, an antenna package and a display device including the same.

To achieve the above object, the following technical solutions are adopted in the present invention.

1. An antenna element including: a radiation body; a first transmission line extending from the radiation body in a first direction; a second transmission line extending from the radiation body in a second direction; a first signal pad extending from an end of the first transmission line in the first direction; and a second signal pad extending from an end of the second transmission line in the second direction.

2. The antenna element according to the above 1, wherein the first transmission line and the first signal pad are formed on the same line in the first direction, and the second transmission line and the second signal pad are formed on the same line in the second direction.

3. The antenna element according to the above 1, wherein the first signal pad extends in a straight line in the first direction, and the second signal pad extends in a straight line in the second direction.

4. The antenna element according to the above 1, wherein an angle between the first direction and the second direction is 80° to 100°.

5. The antenna element according to the above 1, wherein the radiation body, the first transmission line and the second transmission line are formed in a mesh structure, and the first signal pad and the second signal pad are formed in a solid structure.

6. The antenna element according to the above 1, wherein the radiation body has a rhombus shape, and the first transmission line and the second transmission line are respectively connected to two adjacent sides of the radiation body.

7. The antenna element according to the above 6, wherein the first transmission line and the second transmission line are connected to a center of each side of the radiation body.

8. The antenna element according to the above 1, wherein the radiation body has a rectangular shape, and the first transmission line and the second transmission line are respectively connected to two adjacent vertices of the radiation body.

9. The antenna element according to the above 1, further including: a pair of first antenna ground pads extending parallel to the first signal pad and disposed to face each other with the first signal pad interposed therebetween; and a pair of second antenna ground pads extending parallel to the second signal pad and disposed to face each other with the second signal pad interposed therebetween.

10. An antenna package including: the antenna element according to the above 1; and a circuit board including signal wirings bonded to the first signal pad and the second signal pad.

11. The antenna package according to the above 10, wherein the antenna element further includes: a pair of first antenna ground pads extending parallel to the first signal pad and disposed to face each other with the first signal pad interposed therebetween; and a pair of second antenna ground pads extending parallel to the second signal pad and disposed to face each other with the second signal pad interposed therebetween, wherein the circuit board further includes bonding pads bonded to each of the pair of first antenna ground pads and the pair of second antenna ground pads.

12. The antenna package according to the above 11, wherein the circuit board further includes: substrate ground pads extending from each bonding pad parallel to each signal wiring and disposed around each signal wiring.

13. The antenna package according to the above 10, wherein one end of each signal wiring extends parallel to an extending direction of each signal pad, and one end of each signal wiring is bonded to each signal pad.

14. A display device including the antenna element according to the above 1.

15. A display device including the antenna package according to the above 10.

The antenna element according to an exemplary embodiment may include the radiation body and two transmission lines connected to the radiation body and orthogonal to each other. Accordingly, it is possible to implement a dual polarization antenna.

The antenna element according to an exemplary embodiment may form the transmission line and the signal pad connected to the transmission line in a straight line. Thereby, it is possible to reduce a signal loss in a power supply process and improve an antenna gain.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
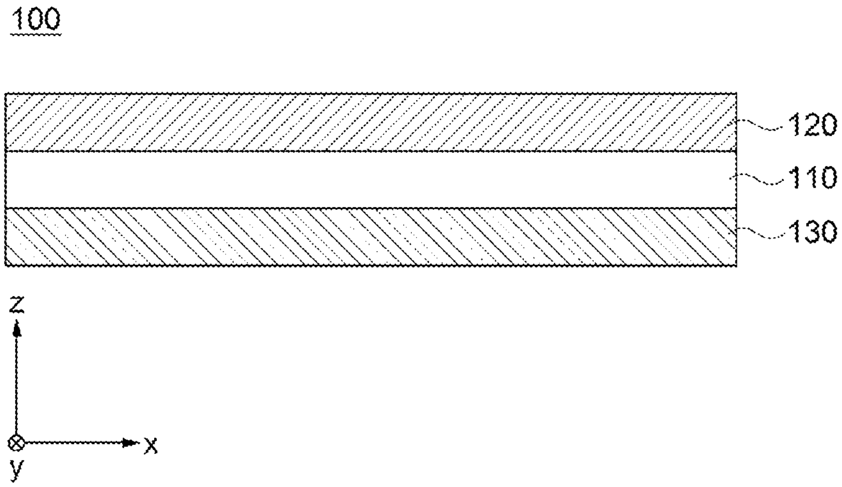
FIG. 1 is a schematic cross-sectional view illustrating an antenna element according to an exemplary embodiment.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

An antenna element described in the present disclosure may be a microstrip patch antenna manufactured in a form of a transparent film. For example, the antenna element may be applied to electronic devices for high frequency or ultra-high frequency (e.g., 3G, 4G, 5G or more) mobile communication, Wi-Fi, Bluetooth, near field communication (NFC), global positioning system (GPS), and the like, but it is not limited thereto. Herein, the electronic device may include a mobile phone, a smart phone, a tablet, a laptop computer, a personal digital assistant (PDA), a portable multimedia player (PMP), a navigation device, an MP3 player, a digital camera, a wearable device and the like. The wearable device may include a wristwatch type, a wrist band type, a ring type, a belt type, a necklace type, an ankle band type, a thigh band type, a forearm band type wearable device or the like. However, the electronic device is not limited to the above-described example, and the wearable device is also not limited to the above-described example. In addition, the antenna element may be applied to various objects or structures such as vehicles and buildings.

In the following drawings, two directions which are parallel to an upper surface of a dielectric layer and cross each other perpendicularly are defined as an x direction and a y direction, and a direction perpendicular to the upper surface of the dielectric layer is defined as a z direction. For example, the x direction may correspond to a width direction of the antenna element, the y direction may correspond to a length direction of the antenna element, and the z direction may correspond to a thickness direction of the antenna element.

FIG. 1 is a schematic cross-sectional view illustrating an antenna element according to an exemplary embodiment.

Referring to FIG. 1, an antenna element 100 according to an exemplary embodiment may include a dielectric layer 110 and an antenna pattern layer 120.

The dielectric layer 110 may include an insulation material having a predetermined dielectric constant. According to an exemplary embodiment, the dielectric layer 110 may include an inorganic insulation material such as glass, silicon oxide, silicon nitride, or metal oxide, or an organic insulation material such as an epoxy resin, an acrylic resin, or an imide resin. The dielectric layer 110 may function as a film substrate of the antenna element 100 on which the antenna pattern layer 120 is formed.

According to an exemplary embodiment, a transparent film may be provided as the dielectric layer 110. In this case, the transparent film may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acrylic resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; a thermoplastic resin such as an epoxy resin and the like. These compounds may be used alone or in combination of two or more thereof. In addition, a transparent film made of a thermosetting resin or an ultraviolet curable resin such as (meth)acrylate, urethane, acrylic urethane, epoxy, silicone, and the like may be used as the dielectric layer 110.

According to an exemplary embodiment, an adhesive film such as an optically clear adhesive (OCA), an optically clear resin (OCR), and the like may also be included in the dielectric layer 110.

According to an exemplary embodiment, the dielectric layer 110 may be formed in a substantial single layer, or may be formed in a multilayer structure of two or more layers.

Capacitance or inductance may be generated by the dielectric layer 110, thus to adjust a frequency band which can be driven or sensed by the antenna element 100. When the dielectric constant of the dielectric layer 110 exceeds about 12, a driving frequency is excessively reduced, such that driving of the antenna in a desired high frequency band may not be implemented. Therefore, According to an exemplary embodiment, the dielectric constant of the dielectric layer 110 may be adjusted in a range of about 1.5 to 12, and preferably about 2 to 12.

According to an exemplary embodiment, an insulation layer (e.g., an encapsulation layer, a passivation layer, etc. of a display panel) inside the display device on which the antenna element 100 is mounted may be provided as the dielectric layer 110.

The antenna pattern layer 120 may be disposed on the upper surface of the dielectric layer 110.

The antenna pattern layer 120 may include a low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in combination of two or more thereof. For example, the antenna pattern layer 120 may include silver (Ag) or a silver alloy (e.g., a silver-palladium-copper (APC) alloy) to implement a low resistance. As another example, the antenna pattern layer 120 may include copper (Cu) or a copper alloy (e.g., a copper-calcium (CuCa) alloy) in consideration of low resistance and fine line width patterning. According to an exemplary embodiment, the antenna pattern layer 120 may include a transparent conductive oxide such as indium tin oxide (ITO), indium zinc oxide (IZO), indium zinc tin oxide (IZTO), zinc oxide (ZnOx), or copper oxide (CuO).

According to an exemplary embodiment, the antenna pattern layer 120 may include a lamination structure of a transparent conductive oxide layer and metal layer, for example, and may have a two-layer structure of transparent conductive oxide layer-metal layer or a three-layer structure of transparent conductive oxide layer-metal layer-transparent conductive oxide. In this case, resistance may be reduced to improve signal transmission speed while improving flexible properties by the metal layer, and corrosion resistance and transparency may be improved by the transparent conductive oxide layer.

According to an exemplary embodiment, the antenna pattern layer 120 may be subjected to blackening treatment. For example, the surface of the antenna pattern layer 120 may be subjected to thermal oxidization, thereby reducing reflectance. Accordingly, it is possible to reduce the pattern from being viewed due to light reflection on the surface of the antenna pattern layer 120.

A surface portion of a metal layer of the antenna pattern layer 120 may be subjected to blackening treatment to form a blackened layer in which a portion of the metal layer is made of metal oxide or metal sulfide. Further, a blackened layer such as a coating film of a black material, or a plating layer of metal such as nickel and chromium may be formed on the metal layer.

The blackened layer is intended to improve transparency and visibility of the metal layer by reducing the reflectance of the metal layer, and may include, for example, at least one of silicon oxide, metal oxide, copper, molybdenum, carbon, tin, chromium, nickel and cobalt.

The composition and thickness of the blackened layer may be variously adjusted according to a desired degree of blackening.

Specific details of the antenna pattern layer 120 will be described below with reference to FIGS. 2 to 4.

According to an exemplary embodiment, the antenna element 100 may further include a ground layer 130. Since the antenna element 100 includes the ground layer 130, vertical radiation characteristics may be implemented.

The ground layer 130 may be disposed on a lower surface of the dielectric layer 110. The ground layer 130 may be overlapped with the antenna pattern layer 120 with the dielectric layer 110 interposed therebetween. For example, the ground layer 130 may be entirely overlapped with a radiation body (see 210 of FIG. 2) of the antenna pattern layer 120.

According to an exemplary embodiment, a conductive member of the display device or display panel on which the antenna element 100 is mounted may be provided as the ground layer 130. For example, the conductive member may include electrodes or wirings such as a gate electrode, source/drain electrodes, pixel electrode, common electrode, data line, scan line, etc. of a thin film transistor (TFT) included in the display panel; and a stainless steel (SUS) plate, heat radiation sheet, digitizer, electromagnetic wave shielding layer, pressure sensor, fingerprint sensor, etc. of the display device.

Figure 2:
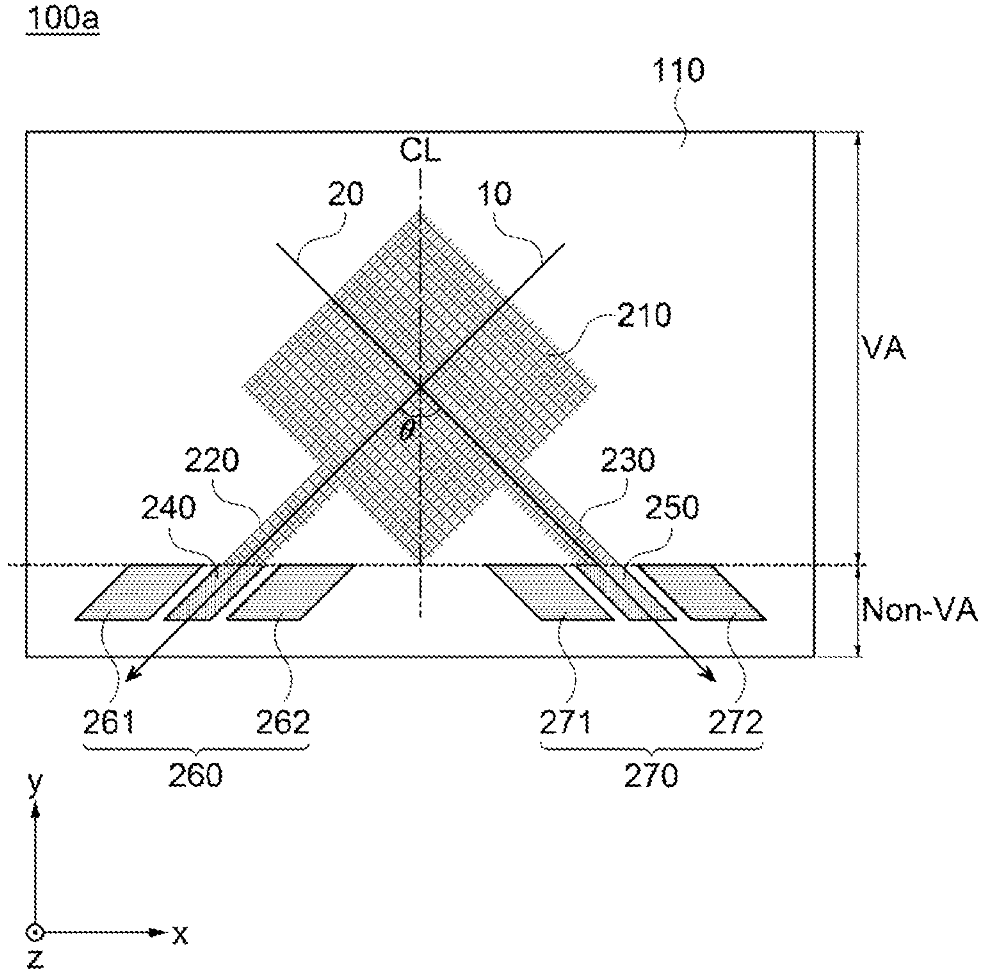
FIG. 2 is a schematic plan view illustrating an antenna element according to an exemplary embodiment.

FIG. 2 is a schematic plan view illustrating an antenna element according to an exemplary embodiment. The antenna element **100*a* shown in FIG. 2 may be an exemplary embodiment of the antenna element 100 shown in FIG. 1**.

Referring to FIG. 2, the antenna element **100*a* according to the exemplary embodiment includes an antenna pattern layer 120 disposed on the dielectric layer 110, and the antenna pattern layer 120 may include a radiation body 210, a first transmission line 220, a second transmission line 230, a first signal pad 240 and a second signal pad 250**.

The radiation body 210 may be formed on the dielectric layer 110 in a mesh structure. Thereby, transmittance of the radiation body 210 may be increased, and flexibility of the antenna element **100*a* may be improved. Therefore, the antenna element 100*a*** may be effectively applied to a flexible display device, while preventing the antenna element from being viewed even if it exists in a display region of the display device.

A length and a width of the radiation body 210 may be determined depending on a desired resonance frequency, radiation resistance and gain.

The radiation body 210 may be electrically connected to the first transmission line 220 and the second transmission line 230 to be supplied with a power through the first transmission line 220 and/or the second transmission line 230. Specifically, the radiation body 210 may receive an electric signal from the first transmission line 220 and/or the second transmission line 230, convert it into an electromagnetic wave signal, and radiate the converted electromagnetic wave signal.

According to an exemplary embodiment, as shown in FIG. 2, the radiation body 210 may be implemented in a rhombus shape, but this is only an embodiment, and it is not limited thereto.

The first transmission line 220 may extend in a straight line from the radiation body 210 in a first direction 10 on the dielectric layer 110 to be connected to the first signal pad 240, and the second transmission line 230 may extend in a straight line from the radiation body 210 in a second direction 20 on the dielectric layer 110 to be connected to the second signal pad 250. Thereby, the first transmission line 220 may electrically connect the first signal pad 240 and the radiation body 210, and the second transmission line 230 may electrically connect the second signal pad 250 and the radiation body 210.

The first direction 10 and the second direction 20 may be parallel to the upper surface of the dielectric layer 110 and may intersect the y direction (a longitudinal direction of the antenna element). In addition, the first direction 10 and the second direction 20 may intersect each other. For example, an angle θ formed by the first direction 10 and the second direction 20 may be 80° to 100°, and preferably 90°. By forming the extending directions of the first transmission line 220 and the second transmission line 230 to be orthogonal to each other, the dual polarization antenna may be effectively implemented.

According to an exemplary embodiment, as shown in FIG. 2, when the radiation body 210 is implemented in a rhombus shape, the first transmission line 220 and the second transmission line 230 may be respectively connected to two adjacent sides of the radiation body 210. In this case, the first transmission line 220 and the second transmission line 230 may be connected to a center of each side of the radiation body.

The first transmission line 220 and the second transmission line 230 may include substantially the same conductive material as the radiation body 210. In addition, the first transmission line 220 and the second transmission line 230 may be formed as a substantial single member by integrally connecting with the radiation body 210, or may be formed as a separate member from the radiation body 210.

The first transmission line 220 and the second transmission line 230 may be formed in a mesh structure. For example, these transmission lines may be formed in a mesh structure having substantially the same shape (e.g., the same line width, the same interval, etc.) as the radiation body 210, or may be formed in a mesh structure having a substantially different shape from the radiation body 210.

The first transmission line 220 and the second transmission line 230 may be formed symmetrically based on a center line CL of the radiation body 210. In this case, the center line CL of the radiation body 210 may be defined as an imaginary line passing through the center of the radiation body 210 and parallel to the y direction (longitudinal direction of the antenna element).

The first signal pad 240 may extend in a straight line from an end of the first transmission line 220 in the first direction 10, and the second signal pad 250 may extend in a straight line from an end of the second transmission line 230 in the second direction 20. For example, the first signal pad 240 and the second signal pad 250 may be implemented in a parallelogram shape, as shown in FIG. 2. Thereby, the first signal pad 240 may be electrically connected to the radiation body 210 through the first transmission line 220, and the second signal pad 250 may be electrically connected to the radiation body 210 through the second transmission line 230.

According to an exemplary embodiment, the first signal pad 240 and the second signal pad 250 may include substantially the same conductive material as the first transmission line 220 and the second transmission line 230. In addition, the first signal pad 240 and the second signal pad 250 may be formed as a substantial single member, respectively, by integrally connecting with the first transmission line 220 and the second transmission line 230, or the first transmission line 220 and the second transmission line 230 may be formed as separate members. When the first signal pad 240 and the second signal pad 250 are formed as a substantial single member, respectively, by integrally connecting with the first transmission line 220 and the second transmission line 230, a distal end of the first transmission line 220 and a distal end of the second transmission line 230 may be provided as the first signal pad 240 and the second signal pad 250, respectively.

According to an exemplary embodiment, the first signal pad 240 and the second signal pad 250 may be formed in a solid structure. The first signal pad 240 and the second signal pad 250 may be formed symmetrically based on the center line CL of the radiation body 210 similarly to the first transmission line 220 and the second transmission line 230.

According to an exemplary embodiment, the first transmission line 220 and the first signal pad 240 may be formed in a straight line on the same line in the first direction 10, and the second transmission line 230 and the second signal pad 250 may be formed in a straight line on the same line in the second direction 20. That is, by forming all of the first transmission line 220 and the first signal pad 240, and the second transmission line 230 and the second signal pad 250 in a straight line without bending, a signal loss may be reduced in the signal transmission process, thus to implement a high-performance dual polarization antenna.

According to an exemplary embodiment, the antenna pattern layer 120 may further include a first antenna ground pad 260 and a second antenna ground pad 270.

The first antenna ground pad 260 may be disposed around the first signal pad 240 to be electrically and physically spaced apart from the first signal pad 240. For example, a pair of first antenna ground pads 261 and 262 extend parallel to the first signal pad 240 so that they are disposed to face each other in the x direction (the width direction of the antenna element) with the first signal pad 240 interposed therebetween.

The second antenna ground pad 270 may be disposed around the second signal pad 250 to be electrically and physically spaced apart from the second signal pad 250. For example, a pair of second antenna ground pads 271 and 272 extend parallel to the second signal pad 250 so that they are disposed to face each other in the x direction (the width direction of the antenna element) with the second signal pad 250 interposed therebetween.

According to an exemplary embodiment, the first antenna ground pad 260 and the second antenna ground pad 270 may be implemented in a parallelogram shape similar to the first signal pad 240 and the second signal pad 250.

The first antenna ground pad 260 and the second antenna ground pad 270 may be formed in a solid structure including the above-described metal or alloy.

Meanwhile, the antenna element 100*a* may include a visual region VA and a non-visual region Non-VA. Herein, the visual region VA may correspond to a display region of the display device in which the antenna element 100*a* is mounted, and the non-visual region non-VA may correspond to a peripheral region of the display device in which the antenna element 100*a* is mounted. The display region may indicate a region in which visual information is displayed, and the peripheral region may indicate opaque regions disposed on both sides and/or both ends of the display region. For example, the peripheral region may correspond to a light-shielding part or a bezel part of the display device.

The radiation body 210, the first transmission line 220 and the second transmission line 230 may be disposed in the visual region VA, and the first signal pad 240, the second signal pad 250, the first antenna ground pad 260 and the second antenna ground pad 270 may be disposed in the non-visual region Non-VA.

Meanwhile, FIG. 2 illustrates an example in which the radiation body 210 is disposed in the visual region VA, but this is only an embodiment. That is, depending on the size, etc. of the radiation body 210 and/or the transmission lines 220 and 230, a portion of the radiation body 210 may be disposed in the non-visual region Non-VA.

Figure 3:
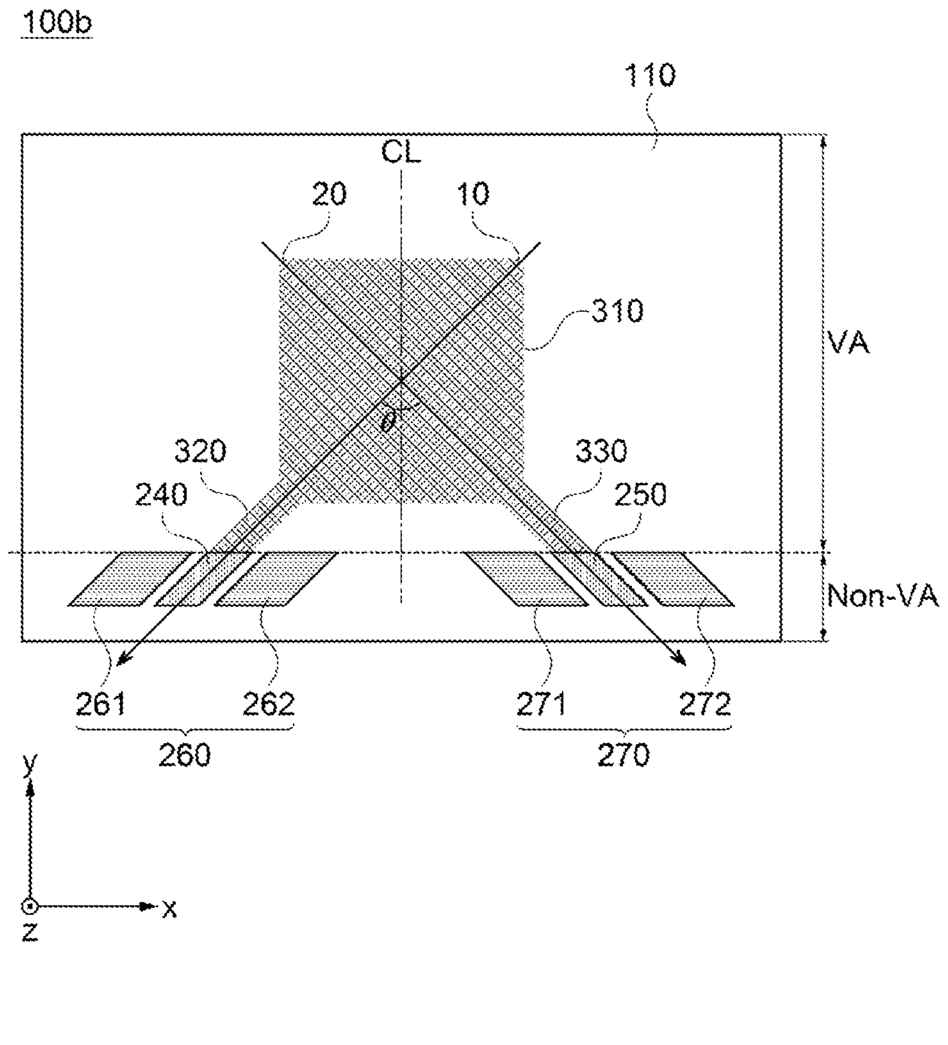
FIG. 3 is a schematic plan view illustrating an antenna element according to an exemplary embodiment.

FIG. 3 is a schematic plan view illustrating an antenna element according to an exemplary embodiment. An antenna element 100*b* shown in FIG. 3 may be an exemplary embodiment of the antenna element 100 shown FIG. 1. Details of the structure and configuration substantially the same as those described with reference to FIGS. 1 and 2 will not be described.

Referring to FIG. 3, a radiation body 310 may be implemented in a rectangular shape. The length and width of the radiation body 310 may be determined depending on the desired resonance frequency, radiation resistance and gain.

A first transmission line 320 may extend in a straight line from the radiation body 310 in the first direction 10 to be connected to a first signal pad 240, and a second transmission line 330 may extend in a straight line from the radiation body 310 in the second direction 20 to be connected to the second signal pad 250. Thereby, the first transmission line 320 may electrically connect the first signal pad 240 and the radiation body 310, and the second transmission line 330 may electrically connect the second signal pad 250 and the radiation body 310.

As described above, the first direction 10 and the second direction 20 may be parallel to the upper surface of the dielectric layer 110 and intersect the y direction (longitudinal direction of the antenna element). In addition, the first direction 10 and the second direction 20 may intersect each other. For example, the angle θ formed by the first direction 10 and the second direction 20 may be 80° to 100°, and preferably 90°. By forming the extending directions of the first transmission line 320 and the second transmission line 330 to be orthogonal to each other, the dual polarization antenna may be effectively implemented.

According to an exemplary embodiment, when the radiation body 310 is implemented in a rectangular shape as shown in FIG. 3, the first transmission line 320 and the second transmission line 330 may be respectively connected to two adjacent vertices of the radiation body 310.

Figure 4:
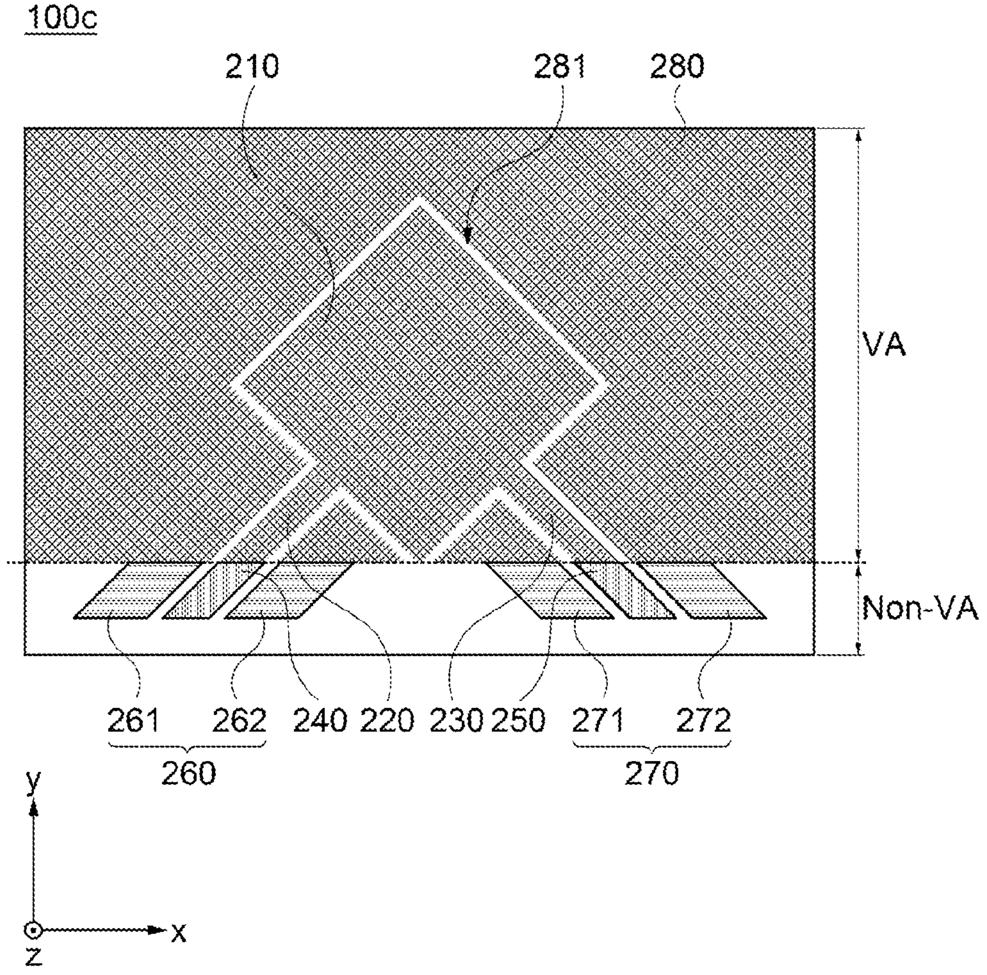
FIG. 4 is a schematic plan view illustrating an antenna element according to an exemplary embodiment.

FIG. 4 is a schematic plan view illustrating an antenna element according to an exemplary embodiment. An antenna element 100*c* shown in FIG. 4 may be an exemplary embodiment of the antenna element 100 shown FIG. 1. Details of the structure and configuration substantially the same as those described with reference to FIGS. 1 to 3 will not be described.

Referring to FIG. 4, the antenna element 100*c* may further include a dummy pattern 280.

The dummy pattern 280 may be disposed around the radiation body 210, the first transmission line 220 and the second transmission line 230.

The dummy pattern 280 may be formed in a mesh structure having substantially the same shape as at least one of the radiation body 210, the first transmission line 220 and the second transmission line 230. According to an exemplary embodiment, some of the conductive lines forming the mesh structure of the dummy pattern 280 may be segmented in order to secure antenna performance.

The dummy pattern 280 may be disposed in the visual region VA. According to an exemplary embodiment, the dummy pattern 280 is selectively disposed only in the visual region VA, and may not be disposed in the non-visual region Non-VA.

The dummy pattern 280 may be formed to be electrically and physically separated from the radiation body 210, the first transmission line 220 and the second transmission line 230. For example, a separation region 281 is formed along side lines or contours of the radiation body 210, the first transmission line 220 and the second transmission line 230, such that the dummy pattern 280 may be separated from the radiation body 210, the first transmission line 220 and the second transmission line 230.

As the dummy pattern 280 is disposed around the radiation body 210, the first transmission line 220 and the second transmission line 230, optical uniformity of the pattern in the visual region VA is improved, thereby it is possible to prevent the antenna pattern from being viewed.

Meanwhile, a plurality of antenna elements 100*a*, 100*b*, and 100*c* described in FIGS. 1 to 4 may be arranged linearly or non-linearly to form an antenna array. In this case, a separation distance between the radiation bodies may be half (λ/2) or more of a wavelength corresponding to the resonance frequency of the radiation body in order to minimize radiation interference from the radiation bodies.

In addition, the shapes of the radiation bodies 210 and 310 shown in FIGS. 2 to 4 are only exemplary embodiments. That is, the radiation bodies 210 and 310 may be formed in a circle or an ellipse, or may be formed in a polygonal plate shape other than the rhombus or rectangle.

Figure 5:
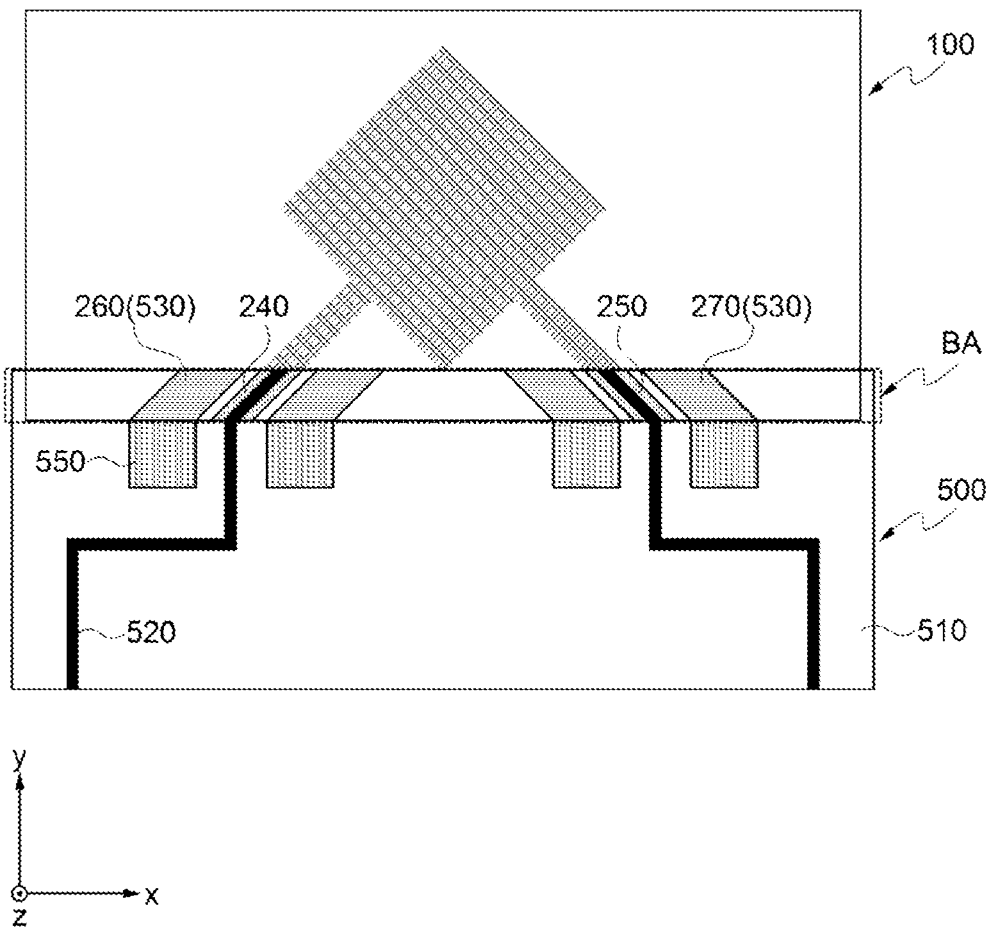
FIGS. 5 and 6 are schematic plan views for describing an antenna package according to an exemplary embodiment.
Figure 6:
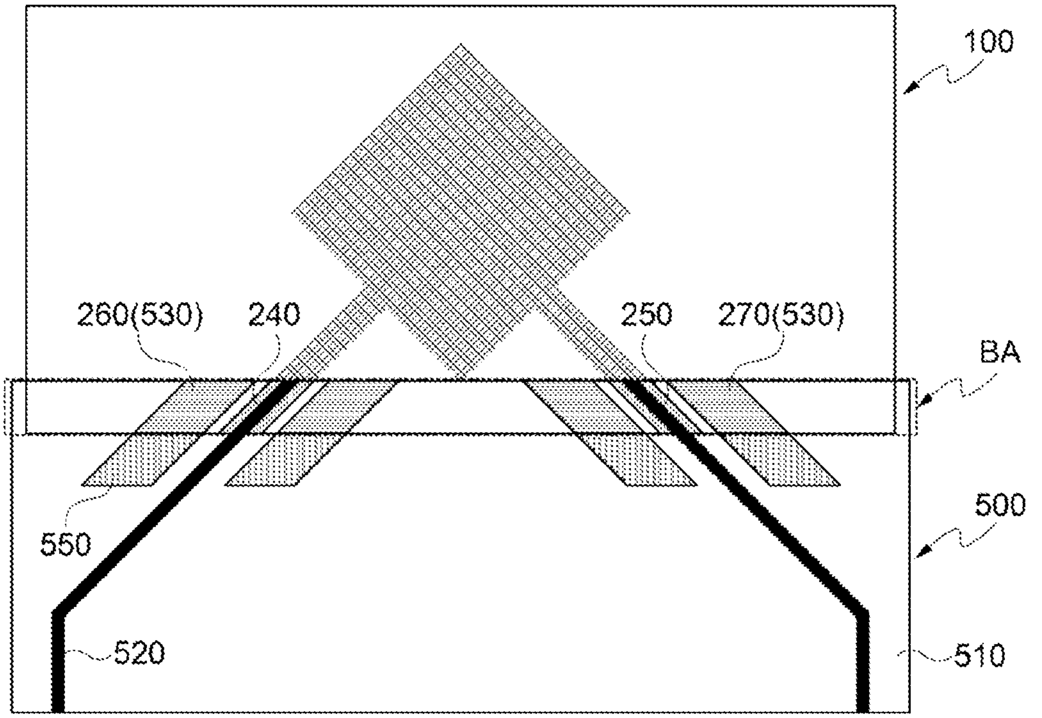

FIGS. 5 and 6 are schematic plan views for describing an antenna package according to an exemplary embodiment. Details of the structure and configuration substantially the same as those described with reference to FIGS. 1 to 4 will not be described.

Referring to FIGS. 5 and 6, the antenna package may include the antenna element 100 and a circuit board 500.

The circuit board 500 may include a core layer 510 and signal wirings 520 formed on the core layer 510. For example, the circuit board 500 may be a flexible printed circuit board (FPCB).

The core layer 510 may include, for example, a flexible resin such as polyimide resin, modified polyimide (MPI), epoxy resin, polyester, cycloolefin polymer (COP), liquid crystal polymer (LCP) and the like. The core layer 510 may include an internal insulation layer included in the circuit board 500.

The signal wirings 520 are arranged on one surface of the core layer 510 and may be provided as power supply lines.

The signal wirings 520 may be bonded to the signal pads 240 and 250 of the antenna element 100 to be electrically connected to the signal pads 240 and 250. For example, one end of each of the signal wirings 520 in a bonding region BA may extend parallel to an extending direction of each of the signal pads 240 and 250 to be bonded to each of the signal pads 240 and 250.

According to an exemplary embodiment, the circuit board 500 may further include a coverlay film formed on one surface of the core layer 510 to cover the signal wirings 520. In this case, by cutting or removing a portion of the coverlay film of the circuit board 500, one end of each of the signal wirings 520 in the bonding region BA may be exposed, and the exposed one end of each of the signal wirings 520 may be bonded to the signal pads 240 and 250, respectively. For example, after attaching a conductive adhesive structure such as an anisotropic conductive film (ACF) on the signal pads 240 and 250, the bonding region BR of the circuit board 500 on which the one ends of each of the signal wirings 520 are located may be disposed on the conductive adhesive structure. Thereafter, each signal wiring 520 of the circuit board 500 may be attached to each of the signal pads 240 and 250 of the antenna element 100 through a heat treatment/pressing process. Thereby, each signal wiring 220 may be electrically connected to each of the signal pads 240 and 250.

According to an exemplary embodiment, the circuit board 500 may further include bonding pads 530 formed around each signal wiring 520. The bonding pads 530 may be disposed in the bonding region BA on one surface of the core layer 510. For example, a pair of bonding pads 530 may be disposed with each signal wiring 520 interposed therebetween.

The bonding pads 530 may be electrically and physically separated from the signal wirings 520, and may be bonded to each of the antenna ground pads 260 and 270 of the antenna element 100 through the above-described conductive adhesive structure. The circuit board 500 includes the bonding pads 530, such that bonding stability between the circuit board 500 and the antenna element 100 may be further improved.

According to an exemplary embodiment, each of the bonding pads 530 may have substantially the same shape and width as each of the antenna ground pads 260 and 270 to be bonded thereto.

According to an exemplary embodiment, the circuit board 500 may further include substrate ground pads 550.

The substrate ground pads 550 may extend from each bonding pad 530 parallel to each signal wiring 520 and are disposed around each signal wiring. For example, a pair of substrate ground pads 550 may be disposed with each signal wiring 520 interposed therebetween.

For example, as shown in FIG. 5, when the signal wiring 520 is bent at the boundary of the bonding region BA and extends in a third direction (e.g., a −y direction), each substrate ground pad 550 may extend from each bonding pad 530 in the third direction. Alternately, as shown in FIG. 6, when the signal wiring 520 extends parallel to the extending direction of each of the signal pads 240 and 250 without being bent at the boundary of the bonding region BA, each substrate ground pad 550 may extend in the same extending direction as each bonding pad 530.

Figure 7:
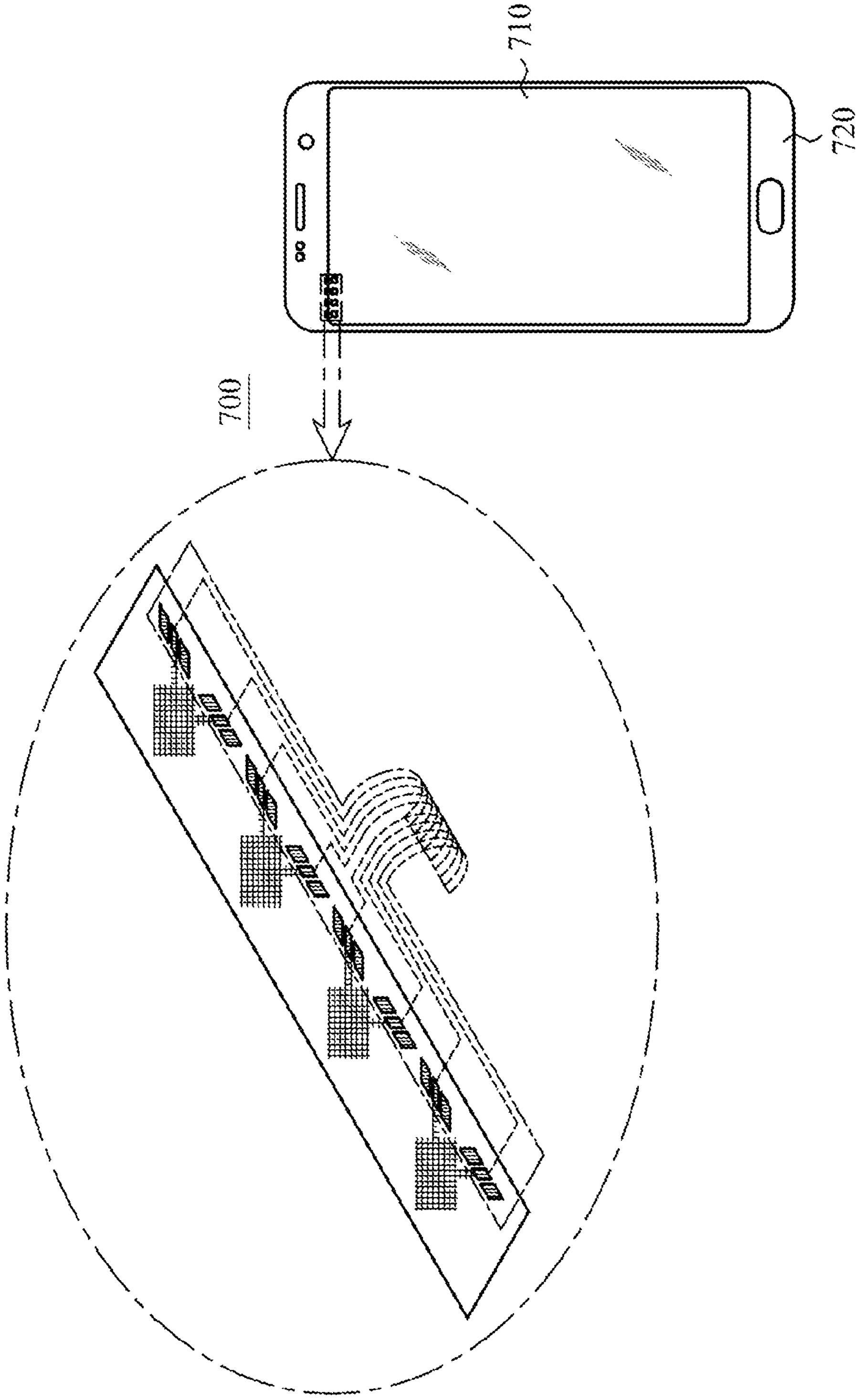
FIG. 7 is a schematic plan view illustrating a display device according to an exemplary embodiment.

FIG. 7 is a schematic plan view illustrating a display device according to an exemplary embodiment. More specifically, FIG. 7 is a view illustrating an external shape including a window of the display device.

Referring to FIG. 7, a display device 700 may include a display region 710 and a peripheral region 720.

The display region 710 may indicate a region in which visual information is displayed, and the peripheral region 720 may indicate opaque regions disposed on both sides and/or both ends of the display region 710. For example, the peripheral region 720 may correspond to the light-shielding part or the bezel part of the display device 700.

According to an exemplary embodiment, the above-described antenna elements 100, 100*a*, 100*b* and 100*c* or the antenna package may be mounted on the display device 700. For example, the visual regions VA of the antenna elements 100, 100*a*, 100*b* and 100*c* may be disposed to correspond to the display region 710, and the non-visual regions Non-VA may be disposed to correspond to the peripheral region 720.

The circuit board 500 may be disposed in the peripheral region 720. According to an exemplary embodiment, by disposing the signal pads 240 and 250 of the antenna elements 100, 100*a*, 100*b* and 100*c* adjacent to an antenna driving unit (e.g., a radio frequency integrated circuit (RFIC)), the signal loss may be suppressed by shortening a path for transmitting and receiving signals.

The antenna elements 100, 100*a*, 100*b* and 100*c* include the radiation bodies 210 and 310, the transmission lines 220, 230, 320 and 330 and/or the dummy pattern 280, which are formed in a mesh structure, such that it is possible to significantly reduce or suppress the pattern from being viewed while improving the transmittance. Accordingly, image quality in the display region 710 may also be improved while maintaining or improving desired communication reliability.

Experimental Example—Evaluation of Antenna Gain

The antenna package (Example 1) of FIG. 5, and the antenna package of FIG. 6 (Example 2) were formed, then antenna gains thereof at 28 GHz were measured. As a result, the measured results shown in Table 1 below were obtained.

TABLE 1

| | Co-pol | Cross-pol |
|---|---|---|
| Example 1 | 4.59 dBi | −6.40 dBi |
| Example 2 | 4.95 dBi | −10.31 dBi |

Referring to Table 1, it can be seen that co-polarization gains of Examples 1 and 2 are 4.59 dBi and 4.95 dBi, respectively. That is, it can be confirmed that, by implementing the transmission lines 220, 230, 320 and 330, and the signal pads 240 and 250 in a straight line, a dual polarization antenna having good antenna performance may be implemented. Meanwhile, in the case of Example 2, it can be seen that the cross-polarization gain is smaller than that of Example 1. It can be confirmed that, as in Example 2, the signal wirings 520 extend parallel to the extending direction of each of the signal pads 240 and 250 without being bent at the boundary of the bonding region BA to minimize portions of the two signal wirings 520 extending in the y direction or increase a distance between portions of the two signal wirings 520 extending in they direction, such that the cross-polarization gain may be reduced.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

What is claimed is:

1. An antenna element comprising:
a radiation body;
a first transmission line extending from the radiation body in a first direction;
a second transmission line extending from the radiation body in a second direction;
a first signal pad extending from an end of the first transmission line in the first direction;
a second signal pad extending from an end of the second transmission line in the second direction;
a pair of first antenna ground pads formed parallel to the first signal pad and disposed to face each other with the first signal pad interposed therebetween; and
a pair of second antenna ground pads formed parallel to the second signal pad and disposed to face each other with the second signal pad interposed therebetween,
wherein the pair of first antenna ground pads are electrically and physically spaced apart from the first signal pad, and
the pair of second antenna ground pads are electrically and physically spaced apart from the second signal pad.

2. The antenna element according to claim 1, wherein the first transmission line and the first signal pad are formed on the same line in the first direction, and the second transmission line and the second signal pad are formed on the same line in the second direction.

3. The antenna element according to claim 1, wherein the first signal pad extends in a straight line in the first direction, and the second signal pad extends in a straight line in the second direction.

4. The antenna element according to claim 1, wherein an angle between the first direction and the second direction is 80° to 100°.

5. The antenna element according to claim 1, wherein the radiation body, the first transmission line and the second transmission line are formed in a mesh structure, and the first signal pad and the second signal pad are formed in a solid structure.

6. The antenna element according to claim 1, wherein the radiation body has a rhombus shape, and the first transmission line and the second transmission line are respectively connected to two adjacent sides of the radiation body.

7. The antenna element according to claim 6, wherein the first transmission line and the second transmission line are connected to a center of each side of the radiation body.

8. The antenna element according to claim 1, wherein the radiation body has a rectangular shape, and the first transmission line and the second transmission line are respectively connected to two adjacent vertices of the radiation body.

9. An antenna package comprising:

the antenna element according to claim 1; and a circuit board including signal wirings bonded to the first signal pad and the second signal pad.

10. The antenna package according to claim 9, wherein the antenna element further comprises:

a pair of first antenna ground pads extending parallel to the first signal pad and disposed to face each other with the first signal pad interposed therebetween; and a pair of second antenna ground pads extending parallel to the second signal pad and disposed to face each other with the second signal pad interposed therebetween, wherein the circuit board further comprises:

bonding pads bonded to each of the pair of first antenna ground pads and the pair of second antenna ground pads.

11. The antenna package according to claim 10, wherein the circuit board further comprises:

substrate ground pads extending from each bonding pad parallel to each signal wiring and disposed around each signal wiring.

12. The antenna package according to claim 9, wherein one end of each signal wiring extends parallel to an extending direction of each signal pad, and one end of each signal wiring is bonded to each signal pad.

13. A display device comprising the antenna package according to claim 9.

14. A display device comprising the antenna element according to claim 1.

* * * * *